United States Patent [19]

Loshaek

[11] 4,028,295

[45] June 7, 1977

[54] HYDROPHILIC POLYMER AND CONTACT LENS

[75] Inventor: Samuel Loshaek, Chicago, Ill.

[73] Assignee: Wesley-Jessen Inc., Chicago, Ill.

[22] Filed: Jan. 8, 1976

[21] Appl. No.: 647,634

[52] U.S. Cl. .......................... 260/29.6 H; 351/160; 526/320

[51] Int. Cl.² ............... C08F 220/20; C08L 31/02; G02B 3/00

[58] Field of Search ................ 260/86.1 E, 86.1 R, 260/80.75, 29.6 H; 526/320; 351/159, 160

[56] References Cited

UNITED STATES PATENTS

| | | | |
|---|---|---|---|
| 2,440,092 | 4/1948 | Hyman et al. ................ | 260/86.1 E |
| 3,784,540 | 1/1974 | Kliment et al. ............... | 260/86.1 E |
| 3,822,089 | 7/1974 | Wichterle .................... | 260/86.1 E |
| 3,850,892 | 11/1974 | Shen et al. .................... | 260/86.1 E |
| 3,893,988 | 7/1975 | Seymour et al. .............. | 260/86.1 E |

FOREIGN PATENTS OR APPLICATIONS 107,946  8/1975  Japan

*Primary Examiner*—Harry Wong, Jr.
*Attorney, Agent, or Firm*—Pennie & Edmonds

[57] ABSTRACT

A hydrophilic polymer and contact lens made therefrom, said polymer consisting essentially of a diester-free glycol monoester of acrylic or methacrylic acid and a comonomer having the formula:

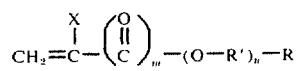

wherein R is a $C_1$ to $C_4$ straight or branched chain alkoxy group, R' is a $C_2$ to $C_3$ straight or branched chain alkylene group, X is hydrogen or a methyl group, *m* is either 1 or 0, and *n* is an integer from 1 to 20.

8 Claims, No Drawings

HYDROPHILIC POLYMER AND CONTACT LENS

BACKGROUND OF THE INVENTION

Polymethacrylate resins are old and well known and have been used for many years in the manufacture of contact lenses including those identified as corneal contact lenses. Such lenses have little hydrophilicity, but excellent optical properties.

More recently, hydrophilic contact lenses have been made utilizing as monomers acrylic and/or methacrylic monoesters of polyfunctional alcohols, particularly glycols, which are cross-linked with the various acrylic and/or methacrylic diesters of these polyfunctional alcohols and other monomers. These polymers have the capability of forming a hydrogel with water.

Customarily, contact lenses are shaped in the unhydrated state and subsequently hydrated. A major deficiency in many of the prior art polymers consisting of the aforesaid monomers is their poor working properties in the unhydrated state, such as grinding, lathing, and polishing. These poor properties make themselves evident, for example, in forming the lens by lathing in that the unhydrated polymer is brittle and chips off making it impossible to form a good lens. The chipping can sometimes be reduced by lathing at a very slow speed but this makes the production rate uneconomical. Similarly, during the polishing of the lens which has been formed on the lathe, an excessive polishing time is required and/or polishing rings may be present in the final product. When such problems occur, the "reject rate" of lenses is uneconomically high.

One method of manufacturing which avoids these deficiencies is to form the lens by polymerizing the aforesaid monomer on a rotational mold such as is described in U.S. Pat. No. 3,408,429. However, this molding process limits the scope of the lens design in that the combination of optical curves that can be formed in the contact lens is limited. On the other hand, lathing provides for an infinite combination of shapes.

In addition, the present hydrophilic lenses are generally fragile, can be easily torn or damaged during the handling necessary for cleaning, sterilization, and/or placement in the eye. Furthermore, many of the present hydrophilic lenses cannot withstand the high temperature (100° – 121° C.) heat treatment necessary to effect proper sterilization to ensure against any bacterial growth in the hydrogel. Also, the present hydrophilic lenses also tend to readily accept proteinaceous deposits originating from the eye mucous fluids which degrade the optical quality of the lens and act to abrade the cornea.

SUMMARY OF THE INVENTION

A new class of hydrophilic polymers has been found which, in the dry state, can be readily ground, machined and polished to give contact lenses of high optical quality. The hydrated contact lenses made from these polymers are strong and resistant to damage during handling and use, resist significantly the adherence of proteinaceous deposits from the eye fluids and can be repeatedly heat sterilized, without compromise in the visual acuity and comfort afforded by this lens.

Briefly, the present invention comprises a hydrophilic polymer and contact lens made therefrom, said polymer consisting essentially of a diester-free glycol monoester of acrylic or methacrylic acid and a comonomer having the formula:

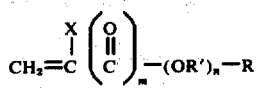

wherein R is a $C_1$ to $C_4$ straight or branched chain alkoxy group, R' is a $C_2$ to $C_3$ straight or branched chain alkylene group, X is hydrogen or a methyl group, n is an integer from 1 to 20, and m is either 1 or 0.

DETAILED DESCRIPTION

The hydrophilic polymer composition of the instant invention consists essentially of a major proportion of groups of a diester-free glycol monoester of acrylic or methacrylic acid (preferably hydroxyethyl methacrylate) and a minor proportion of groups of a non-hydroxy terminated alkoxy monomer. The polymer is formed by admixing said diester-free and alkoxy monomers and then polymerizing, as hereinafter more specifically described.

One of the essential components of the hydrophilic polymers of the present invention is, as noted, a glycol monoester of acrylic or methacrylic acid, preferably hydroxyethyl methacrylate. It is known in the usual manufacture of such glycol monoesters that there are significant amounts of the diester also formed. This is considered to be a contaminant in the polymers of the instant invention and, accordingly, the monoesters are purified so that there is essentially no diester present in the monomer mixture. Using hydroxyethyl methacrylate as an example, it being understood that the other glycol esters are similarly purified, the monomer formed in the usual manner can be purified as set forth in U.S. Pat. No. 3,162,677. This patent shows that the use of certain solvents will enable extraction from the monoester of the diester impurity. Alternatively, the monoester can be purified of the diester content by utilizing the procedures set forth in French Pat. No. 1,567,453. This patent relies upon a combination of salting out and crystallization in solvents in order to remove the diesters from the monoesters. A preferred procedure to effect such purification is a modification of these solvent purification techniques and is described in the procedure that follows.

The preferred method of purification will be illustrated by purification of a commercial grade of 2-hydroxyethyl methacrylate (HEMA) containing 2.8% ethylene glycol dimethacrylate (EDMA), although it will be understood that a similar purification procedure is applicable to separation of other diesters from monoesters used in the present invention.

Into a glass reaction flask equipped with a stirrer was added one part by volume of the HEMA and five parts by volume of water and this was thoroughly mixed.

To this solution was added ½ part by volume Shell Sol B, a petroleum spirit fraction with boiling point range of 59° – 82° C. and, after thorough mixing, the solution was allowed to stand without stirring until two layers formed. The top layer was drawn off with a siphon. This latter extraction procedure starting with the addition of ½ part of Shell Sol B was repeated two more times.

To the mixture in the flask there was added 0.05 parts by weight of sodium bicarbonate and 1.5 parts by weight of sodium chloride for each part by volume of HEMA used. This solution was thoroughly mixed for at least ½ hour.

There is now added ½ part by volume (based on the one part by volume of starting HEMA) of methylene chloride and this is thoroughly mixed. The stirring is discontinued and the solution is allowed to settle into two layers. The top layer containing the methylene chloride and most of the HEMA is drawn off and set aside. To the solution remaining in the flask, another ½ part by volume of methylene chloride is added and, after mixing, is allowed to settle into two layers. This time the methylene chloride layer which is on the bottom contains most of the HEMA, and it is drawn off and combined with the previous methylene chloride layer. The methylene chloride layers contain the HEMA from which EDMA has been removed.

The HEMA was analyzed on a Hewlett-Packard gas chromatograph, Model 5750, equipped with a digital integrator, 6 ft. × ⅛ inch 10% Carbowax 20M column and a thermal conductivity detector capable of detecting less than 0.065 mole percent (0.1% by weight) of EDMA. No EDMA was detected under these conditions.

The solution of HEMA and methylene chloride is placed in a glass vacuum distillation apparatus. To this solution is added 0.075% by weight based on the estimated weight of the HEMA, of monomethyl ether of hydroquinone or other suitable polymerization inhibitor. The methylene chloride is stripped from this solution under agitation with heating, the temperature being maintained below 55° C. The residue in the flask is filtered and distilled under high vacuum (0.1 mm. Hg pressure or less) to give the purified HEMA in the distillate.

As used herein, the terms "diester free" and "essentially no diester" are meant to include those glycol monoesters which, under testing by gas chromatography, show essentially no diester under the test procedure discussed above; stated in terms of percent by weight, there must be less than 0.1% by weight of diester in the monomer mixture.

Examples of suitable glycol monoesters are the $C_2$ to $C_4$ hydroxyalkyl acrylates and methacrylates, such as hydroxyethyl methacrylate, hydroxypropyl acrylate, hydroxypropyl methacrylate, hydroxybutyl methacrylate, and the like, with the hydroxyethyl methacrylate preferred.

The other essential comonomer used in formulating the polymer is a non-hydroxyterminated alkoxy monomer of the general formula previously set forth. Alkoxyalkyl acrylates and methacrylates are preferred, but comonomers such as alkylcarbitol acrylates and methacrylates, alkoxytriglycol acrylates and methacrylates, and vinyl ether monomers are also suitable.

Specific examples are ethoxyethyl methacrylate, methoxyethyl methacrylate, ethoxyethyl acrylate, methyl carbitol methacrylate, ethylcarbitol methacrylate, butyl carbitol methacrylate, ethoxytriglycol methacrylate, methoxyethyl vinyl ether, vinylethoxy tetraglycol, and vinylmethoxy triglycol.

In forming the copolymer, it is only necessary that the glycol monoester of acrylic or methacrylic acid and the comonomer be polymerized by any of the usual polymerization procedures in the presence of a free radical initiator. Any of the usual free radical catalysts or initiators may be used. Examples of suitable catalysts are benzoyl peroxide, isopropylperoxydicarbonate, di-(sec-butyl)peroxydicarbonate and bisazoisobutyronitrile.

Polymerization temperature is generally within the range of 50° – 200° F., preferably 80° – 100° F., although other temperatures outside of these ranges are also operable. The reaction times vary widely depending upon temperatures, catalyst concentration, and reactants used, with anywhere from 1 to 12 days being the usual time for complete polymerization. Gelation will usually occur in several hours. Of course, the higher temperatures favor the shorter reaction time.

The amount of water absorbed in the hydrated state and the softness are a function of the structure and amount of the comonomer used. Generally, increasing the length of the comonomer side-chain increases the softness while increasing the number of OR' groups in the comonomer increases the water content of the hydrated polymer. Increasing the number of carbon atoms in the alkoxy radical R of the comonomer from 1 to 4, decreases the hydrophilicity of the resulting polymer. By regulating the amount and type of such comonomer the desired softness and hydrophilicity can be obtained.

For most satisfactory results as to proportions, the glycol monoesters of the methacrylic acid form the predominant portion of the polymer, preferably, greater than 55% by weight. It has been found for contact lenses with the most desired degree of hydrophilicity that a copolymer of a composition comprising a weight ratio of 70 – 90% of the glycol monoesters and 10 – +% of the comonomer is preferred. Generally, the comonomer can comprise as much as 45% by weight of the copolymer to as little as 5% by weight. Generally, for polymers of this composition, the water content of the resultant lenses will vary from about 25 to 40% by weight in the hydrated state.

It is believed that inclusion of the comonomer produces polymer chains with greater segmental motion and rotational freedom at a molecular level, thereby increasing the flexibility, toughness and extensibility of the overall polymer. This, in turn, results in a polymer of improved machining qualities in the unhydrated state without sacrificing physical and optical properties upon hydration.

In accordance with the present invention, contact lenses can be made by machining the polymer in the unhydrated state to give the necessary optical specifications in the hydrated state using presently available apparatus and procedures employed to machine "hard" lenses, and which, in hydrated state, is "soft" enough to be comfortable to the user, but still rigid enough in use to hold its optical corrections more exactly. The machining qualities of the polymer in the unhydrated state are independent of the amount of water which the polymer will absorb in the hydrated state.

The invention will be further described in connection with the following examples which are in proportions be weight unless expressly stated to the contrary.

EXAMPLE 1

Hydroxyethyl methacrylate (HEMA) and ethoxyethyl methacrylate (EOEMA) were copolymerized at two different ratios utilizing benzoyl peroxide as the catalyst and at a temperature of about 90° F. The HEMA used had first been purified as described above to remove the diester.

The two different ratios were: 80% HEMA and 20% EOEMA, and 85% HEMA and 15% EOEMA (all of these ratios are by weight of the finished polymer). The reactants were placed into a glass tube and, after polymerization was completed, the cylinder that resulted was cut into discs of the type used to make contact lenses and then tested to determine both the hardness as well as the swelling capability of the polymer and resultant lens. The discs had a thickness of 10 mm and a diameter of 0.13 mm. The results are set forth in Table I below.

TABLE I

| Polymer Composition | Water | Shore A Hardness | Linear Swelling Index |
|---|---|---|---|
| 85% HEMA, 15% EOEMA | 30.4% | 39/33 | 15.8% |
| 80% HEMA, 20% EOEMA | 27.7% | 39/30 | 14.1% |

The water content is measured by first weighing the discs, then soaking the discs in a physiological saline solution for two days at 70° C., cooling to room temperature, and maintaining the lens at room temperature for 1 day and then again weighing. The different in the weights is then calculated as a percentage figure and is obtained by dividing the weight difference by the wet weight.

The Shore A Hardness Test is the standard ASTEM technique for such measurement. Finally, the linear swelling index, again a percentage figure, is the difference in diameter of the disc before and after hydrating in the physiological saline solution divided by diameter of the disc before hydration.

EXAMPLE 2

The polymerization as described in Example 1 was carried out utilizing, however, methoxymethyl methacrylate (MOEMA) in place of the EOEMA.

Table II shows the properties of the discs formed from the copolymers resultant as to hardness and hydrophilicity.

TABLE II

| Polymer Composition | Water Content | Shore A Hardness | Linear Swelling Index |
|---|---|---|---|
| 85% HEMA, 15% MOEMA | 30.6% | 38/32 | 16.4% |
| 80% HEMA, 20% MOEMA | 29.6% | 38/32 | 16.0% |

EXAMPLE 3

The polymerization as described in Example 1 was carried out except that butyl carbitol methacrylate,

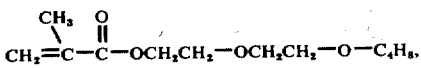

(BCMA) was substituted for the EOEMA and carrying ratios of the comonomers used.

The hardness and hydrophilicity of discs made from the resultant copolymers were tested and the results are set forth in Table III.

TABLE III

| Polymer Composition | Water Content | Shore A Hardness | Linear Swelling Index |
|---|---|---|---|
| 95% HEMA, 5% BCMA | 32.9% | 36/33 | 17.7% |
| 90% HEMA, 10% BCMA | 30.8% | 37/32 | 16.2% |
| 87.5% HEMA, 12.5% BCMA | 28.4% | 36/31 | 14.1% |

TABLE III-continued

| Polymer Composition | Water Content | Shore A Hardness | Linear Swelling Index |
|---|---|---|---|
| 85% HEMA, 15% BCMA | 23.5% | 65/55 | 10.1% |

EXAMPLE 4

The polymerization of Example 1 was carried out except that ethylcarbitol methacrylate (ECMA) was substituted for the EOEMA.

The hardness and hydrophilicity results of lenses formed from the resultant copolymers are set forth in Table IV.

TABLE IV

| Polymer Composition | Saline Content | Shore A Hardness | Linear Swelling Index |
|---|---|---|---|
| 85% HEMA, 15% ECMA | 31.3% | 33/31 | 17.2% |
| 80% HEMA, 20% ECMA | 32.6% | 37/33 | 17.2% |

EXAMPLE 5

The polymerization as described in Example 1 was carried out except that ethoxytriglycol methacrylate (EOTGMA) was substituted for the EOEMA and varying ratios of the comonomers used.

The hardness and hydrophilicity of discs made from the resultant copolymers were tested and the results are set forth in Table V.

TABLE V

| Polymer Composition | Water Content | Shore A Hardness | Linear Swelling Index |
|---|---|---|---|
| 90% HEMA, 10% EOTGMA | 36.7% | 34/32 | 20.1% |
| 80% HEMA, 20% EOTGMA | 35.5% | 33/30 | 18.9% |

EXAMPLE 6

The polymerization as described in Example 1 was carried out except that ethoxyethyl acrylate (EOEA) was substituted for the EOEMA and varying ratios of the comonomers used.

The hardness and hydrophilicity of discs made from the resultant copolymers were tested and the results are set forth in Table VI.

TABLE VI

| Polymer Composition | Water Content | Shore A Hardness | Linear Swelling Index |
|---|---|---|---|
| 85% HEMA, 15% EOEA | 30.8% | 26/22 | 16.0% |

EXAMPLE 7

Polymerizations as in Example 1 were carried out except that methyl carbitol methacrylate (MCM) was substituted for the EOEMA. The hardness and hydrophilicity of discs made from the resultant copolymers were tested and the results are set forth in Table VII.

TABLE VII

| Polymer Composition | Water Content | Shore A Hardness | Linear Swelling Index |
|---|---|---|---|
| 90% HEMA, 10% MCM | 37.3% | 29/25 | 19.6% |

TABLE VII-continued

| Polymer Composition | Water Content | Shore A Hardness | Linear Swelling Index |
|---|---|---|---|
| 85% HEMA, 15% MCM | 37.9% | 30/27 | 19.1% |
| 80% HEMA, 20% MCM | 38.2% | 21/17 | 19.1% |
| 75% HEMA, 25% MCM | 38.7% | 24/21 | 20.3% |
| 45% HEMA, 55% MCM | 38.4% | 26/24 | 19.8% |

EXAMPLE 8

A series of polymerizations was carried out using HEMA that had not been purified and, consequently, contained significant amounts of ethylene glycol dimethacrylate (EDMA) which replaced part of the comonomer.

The results as to hardness and hydrophilicity of discs formed from the resultant copolymers are set forth in Table VIII.

TABLE VIII

| Polymer Composition | Water Content | Shore A Hardness | Linear Swelling Index |
|---|---|---|---|
| 77% HEMA, 20% MCM, 3% EDMA | 32.5% | 55/49* | 15.2% |
| 75% HEMA, 20% MCM, 5% EDMA | 30.0% | 63/59 | 14.7% |
| 67% HEMA, 30% MCM, 3% EDMA | 32.4% | 49/44 | 15.8% |
| 65% HEMA, 30% MCM, 5% EDMA | 30.6% | 62/58 | 16.1% |
| 57% HEMA, 40% MCM, 3% EDMA | 31.8% | 50/43* | 16.4% |
| 47% HEMA, 50% MCM, 3% EDMA | 33.5% | 50/42* | 16.6% |

*Note: A hole was formed during the indentation of Shore A Hardness measurement. This shows the rigid properties of polymers containing the EDMA.

A comparison of the polymers made with MCM in Table VII, essentially free of diester with those of Table VIII, containing significant amounts of diester, shows that the latter have a lower water content, lower swelling index, are more rigid and weaker. Also, the polymer showed significantly greater brittleness during machining and polishing.

EXAMPLE 9

The polymerization of Example 1 was carried out except that the following ether comonomers were substituted for the EOEMA: methoxymethyl vinyl ether (MEVE), vinyl ethoxy tetraglycol (VETG), and vinylmethoxy triglycol (VMTG).

The hardness and hydrophilicity properties are set forth in Table IX.

TABLE IX

| Polymer Composition | Water Content | Shore A Hardness | Linear Swelling Index |
|---|---|---|---|
| 95% HEMA, 5% VETG | 34.0% | 37/35 | 13.4% |
| 95% HEMA, 5% VMTG | 33.9% | 36/34 | 18.1% |
| 95% HEMA, 5% MEVE | 34.4% | 33/31 | 18.9% |
| 90% HEMA, 10% MEVE | 35.1% | 31/29 | 18.9% |
| 80% HEMA, 20% MEVE | 35.1% | 29/28 | 17.5% |

The contact lenses of the present invention are formed from the novel polymers herein disclosed by the conventional techniques and apparatus used to form contact lenses from the polymethacrylates. Such techniques most commonly include forming the polymer into rods which are precisely sized as to diameter by a grinding procedure, cutting the rods into blanks (or discs), and lathing and polishing the discs into lenses having the desired optical specifications. As such, the methods of making the lenses form no part of the instant invention.

The resultant lenses have the degree of hydrophilicity necessary to minimize discomfort to the user while, at the same time, being sufficiently rigid to insure that the optical specifications of the lens are preserved during use and that the lens can be handled for use without being torn or otherwise damaged. Also, importantly, the lenses can be heat sterilized thereby assuring sterility for use.

EXAMPLE 10

The polymerization of Example 1 is carried out except that the HEMA used therein is replaced, separately and in turn, by an equivalent amount of each of the following monomers: hydroxypropyl acrylate, hydroxypropyl methacrylate, hydroxyethyl acrylate, and hydroxybutyl methacrylate. In each case, hydrophilic polymers are formed which can be formed into contact lenses having a suitable degree of hydrophilicity and strength and which can be heat sterilized, utilizing conventional contact lens making apparatus.

Clinical trials were carried out with contact lenses made from the polymer of Example 1 of this invention. Unexpectedly, it was found that the lenses resisted the deposit and adhesion of proteinaceous material from the eye fluid. These deposits represent a significant problem with prior art lenses in that they opacify the lens and cause its surfaces to be roughened which, in turn, irritates the eye and makes the lenses unwearable. Most often such lenses must be discarded. It was also found in these trials that the lenses rarely had to be replaced due to their being torn or otherwise damaged by handling by the patient. Contact lenses of the prior art, on the contrary, require frequent replacement due to their being easily damaged and torn.

In the aforesaid clinical trials, the contact lenses of Example 1 were sterilized daily by autoclaving them at 121° C. for at least 15 minutes. This heat treatment has no effect on the physical or optical properties of the lenses. It was found in an in vitro experiment that the lenses could be autocalved at 121° C. for 15 minutes for the equivalent time of three years with no adverse effect on the lenses. Also, in these clinical trials, it was found that the patients could wear properly fitted lenses with great comfort and no physiological damage to the cornea.

While the invention has been described in connection with preferred embodiments, it is not intended to limit the invention to the particular forms set forth, but, on the contrary, it is intended to cover such alternatives, modifications, and equivalents as may be included within the spirit and scope of the invention as defined by the appended claims.

What is claimed is:

1. A contact lens consisting essentially of hydrated polymer consisting essentially of, for each 100% by weight, about 70 to 90% by weight of a hydroxy $C_2$-$C_4$ alkyl monoester of acrylic or methacrylic acid containing less than 0.1% by weight of a diester and 10 to 30% by weight of a comonomer having the general formula:

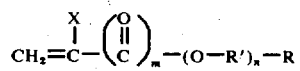

wherein R is a $C_1$ to $C_4$ straight or branched chain alkoxy group, R' is a $C_2$ to $C_3$ straight or branched chain alkylene group, X is hydrogen or a methyl group, $m$ is 0, and $n$ is 1 or 2, said polymer having a water content of about 25 to 40% by weight, a linear swelling index of about 10 to 18%, and a Shore A hardness of about 20 to 65.

2. The lens of claim 1 wherein the monoester is a hydroxyethyl or hydroxypropyl acrylate or methacrylate and the comonomer is selected from alkoxyalkyl acrylates, alkoxyalkyl methacrylates, alkylcarbitol acrylates, or alkylcarbitol methacrylates.

3. The lens of claim 1 wherein the monoester is hydroxyethyl methacrylate and the comonomer is an alkoxyalkyl methacrylate.

4. The lens of claim 1 wherein the comonomer is ethoxyethyl methacrylate.

5. A corneal contact lens consisting essentially of a hydrated polymer consisting essentially of, for each 100% by weight, about 70 to 90% by weight of a hydroxy $C_2$ 14 $C_4$ alkyl monoester of acrylic or methacrylic acid containing less than 0.1% by weight of a diester and 10 to 30% by weight of a comonomer having the general formula:

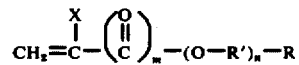

wherein R is a $C_1$ to $C_4$ straight or branched chain alkoxy group, R' is a $C_2$ to $C_3$ straight or branched chain alkylene group, X is hydrogen or a methyl group, $m$ is 0 and $n$ is 1 or 2, said polymer having a water content of about 25 to 40% by weight, a linear swelling index of about 10 to 18%, and a Shore A hardness of about 20 to 65.

6. The contact lens of claim 5 wherein the monoester is hydroxyethyl methacrylate and the comonomer is an alkoxyalkyl methacrylate.

7. The contact lens of claim 6 wherein the polymer comprises from about 70 to 90% hydroxyethyl methacrylate and about 10 to 30% ethoxyethyl methacrylate.

8. A corneal contact lens consisting essentially of a hydrated polymer consisting essentially of 70 to 90% hydroxyethyl methacrylate containing less than 0.1% by weight of diester and about 10 to 30% ethoxyethyl methacrylate, said polymer having a water content of about 25 to 40% by weight, a linear swelling index of about 10 to 18%, and a Shore A hardness of about 20 to 65.

* * * * *